(12) United States Patent
Palm

(10) Patent No.: US 6,810,644 B2
(45) Date of Patent: Nov. 2, 2004

(54) PACKAGING MACHINE AND METHOD FOR PRODUCING SEALED PACKAGES OF POURABLE FOOD PRODUCTS

(75) Inventor: Lars-Erik Palm, Lund (SE)

(73) Assignee: Tetra Laval Holdings & Finance S.A., Pully (CH)

(*) Notice: Subject to any disclaimer, the term of this patent is extended or adjusted under 35 U.S.C. 154(b) by 61 days.

(21) Appl. No.: 10/073,219

(22) Filed: Feb. 13, 2002

(65) Prior Publication Data

US 2002/0116904 A1 Aug. 29, 2002

(30) Foreign Application Priority Data

Feb. 23, 2001 (EP) .............................................. 01104376

(51) Int. Cl.[7] ................................................. B65B 9/00
(52) U.S. Cl. ......................................... 53/450; 53/547
(58) Field of Search ................................ 493/189, 235, 493/238, 21, 36; 53/450, 550, 477, 547

(56) References Cited

U.S. PATENT DOCUMENTS

| | | | |
|---|---|---|---|
| 3,300,944 A | | 1/1967 | Thesing |
| 4,088,260 A | | 5/1978 | Stark et al. |
| 4,581,874 A | * | 4/1986 | Rechtsteiner et al. .......... 53/425 |
| 4,853,352 A | * | 8/1989 | Newkirk et al. ............... 501/88 |
| 5,966,899 A | | 10/1999 | Fontanazzi |

FOREIGN PATENT DOCUMENTS

| | | |
|---|---|---|
| CA | 592747 | 2/1960 |
| EP | 0 808 772 | 11/1997 |
| EP | 0 887 273 | 12/1998 |
| EP | 0 992 431 | 4/2000 |
| EP | 1 065 142 | 1/2001 |
| GB | 1 370 831 | 10/1974 |

* cited by examiner

Primary Examiner—Rinaldi I. Rada
Assistant Examiner—John Paradiso
(74) Attorney, Agent, or Firm—Burns, Doane, Swecker & Mathis, L.L.P.

(57) ABSTRACT

There is described a packaging machine (1) for producing sealed aseptic packages (2) of a pourable food product from a tube (3) of packaging material fed along a vertical path (A) and filled continuously with the food product. The machine (1) has gripping means (13, 14) for gripping the tube (3) at equally spaced cross sections (15); and sealing means (23, 24; 34, 35) for sealing the packaging material of the tube (3) along the cross sections (15), and in turn having a first and a second sealing device (23, 24; 34, 35) forming part of respective distinct, successive units (10, 20) of the machine (1). The first sealing device (23, 24) interacts with the cross sections (15) of the tube (3) for a time (T1) shorter than the time (T) required to achieve complete sealing of the cross sections (15), but sufficient to form respective temporary aseptic transverse sealing bands (25); and the second sealing device (34, 35) interacts with said temporary sealing bands (25) to seal them completely. (FIGS. 1 and 2)

10 Claims, 1 Drawing Sheet

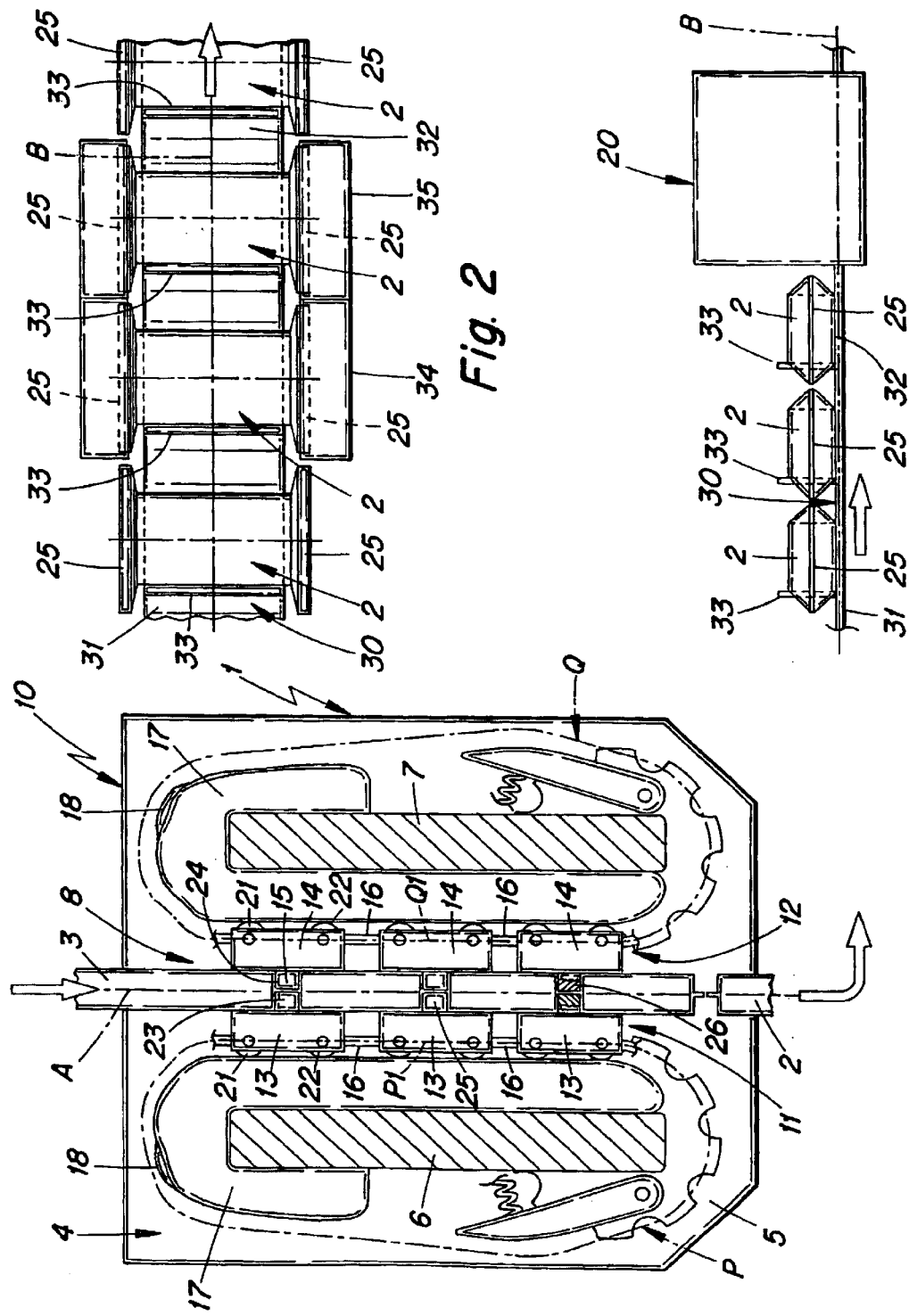

PACKAGING MACHINE AND METHOD FOR PRODUCING SEALED PACKAGES OF POURABLE FOOD PRODUCTS

The present invention relates to a packaging machine and method for continuously producing sealed packages or pourable food products from a tube of packaging material.

Many pourable food products, such as fruit juice, pasteurized or UHT (ultra-high-temperature processed) milk, wine, tomato sauce, etc., are sold in packages made of sterilized packaging material.

A typical example of such a package is the parallelepiped-shaped package for liquid or pourable food products known as Tetra Brik Aseptic (registered trademark), which is formed by folding and sealing laminated strip packaging material. The laminated packaging material comprises layers of fibrous material, e.g. paper, covered on both sides with heat-seal plastic material, e.g. polyethylene; and, in the, case of aseptic packages, the side of the packaging material eventually contacting the food product in the package also has a layer of barrier material, e.g. an aluminium sheet, which is in turn covered with a layer of heat-seal plastic material.

As is known, such packages are made on fully automatic packaging machines, on which a continuous tube is formed from the web-fed packaging material; the web of packaging material is sterilized on the packaging machine itself, e.g. by applying a chemical sterilizing agent, such as a hydrogen peroxide solution, which, after sterilization, is removed, e.g. vaporized by heating, from the surfaces of the packaging material; and the web of packaging material so sterilized is maintained in a closed sterile environment, and is folded and sealed longitudinally to form a vertical tube.

The tube is filled continuously from the top with the sterilized or sterile-processed food product, and is sealed by pairs of jaws and then cut along equally spaced cross sections to form pillow packs, which are then folded mechanically to form the finished, e.g. parallelepiped-shaped, packages.

Packaging machines of the above type are known, e.g. from EP-A-0 887 273, which comprise two forming chains defining respective endless paths and in turn defined by a number of articulated jaws and counterjaws respectively; and the two paths have respective substantially straight branches facing and parallel to each other, between which the tube of packaging material is fed, and along which the jaws cooperate with the corresponding counterjaw is to grip and heat seal the tube at a number of successive transverse bands.

The face of each jaw comprises an induction heating element defining two straight, elongated, active surfaces, which interact with and heat the tube material to the sealing temperature, and extend on opposite sides of and parallel to an intermediate plane perpendicular to the tube axis. In place of a heating element, each counterjaw has two pressure pads made of plastic material and which cooperate wish the respective active surfaces of the heating element on the corresponding jaw.

The pillow packs so formed are separates at a cutting station downstream from the forming chains and comprising two counter-rotating rollers, one with a number of knives. Alternatively, packaging machines are known, e.g. from C-A-592747, U.S. Pat. No. 3,300,944 and EP-A-992431, in which the knives are incorporated in the jaws; and, in EP-A-992431, in particular, the cutting operation may advantageously be performed prior to the sealing operation.

The above solutions provide for producing packages at an extremely fast output rate and of adequate quality and reliability.

The extent to which the output rate of such packaging machines can be increased; however, is determined by how long the heating element of each jaw must be held contacting the tube material to achieve complete sealing of the packaging material.

It is an object of the present invention to provide a packaging machine designed to eliminate the above restriction.

According to the present invention, there is provided a packaging machine for producing sealed aseptic packages of a pourable food product from a tube of packaging material fed along a vertical path and filled continuously with said food product, said machine comprising:

gripping means for gripping said, tube at equally spaced cross sections; and sealing means for sealing the packaging material of said tube along said cross sections;

and being characterized in that said sealing means comprise a first and a second sealing device forming part of respective distinct, successive units of said machine; said first sealing device interacting with said cross sections for a time shorter than the time required to achieve complete sealing of the cross sections, but sufficient to form respective temporary aseptic transverse sealing bands; and said second; sealing device interacting with said temporary sealing bands to seal them completely.

The present invention also relates to a method of producing sealed packages of a pourable food product from a tube of heat-seal sheet packaging material, fed along a vertical path and filled continuously with said food product, said method comprising the steps of:

gripping said tube at equally spaced cross sections; and sealing the packaging material of said tube along said cross sections;

and being characterized in that said sealing step comprises a first and a second sealing operation performed successively on distinct units of a packaging machine for producing said packages; said first sealing operation being performed along said cross sections for a time shorter than the time required to achieve complete sealing of the cross sections, but sufficient to form, respective temporary aseptic transverse sealing bands; and said second sealing operation being performed to finally seal said temporary sealing bands.

A preferred, non-limiting embodiment of the present invention will be described by way of example with reference to the accompanying drawings, in which:

FIG. 1 shows a schematic side view, with parts removed for clarity, of a packaging machine in accordance with the present invention;

FIG. 2 shows a larger-scale, top-plan view of a forming unit of the FIG. 1 packaging machine.

Numbers 10 and 20 in FIG. 1 indicate as a whole respective forming units of a packaging machine 1 (only shown as required to permit a clear understanding of the present invention) for continuously producing aseptic sealed packages 2 of a pourable food product, such as pasteurized or UHT milk, fruit juice, wine, etc., from a vertical tube 3 of packaging material.

Tube 3 is formed in known manner upstream from unit 10 by longitudinally folding and sealing a web of heat-seal sheet material, a is filled continuously from the top with the sterilized or sterile-processed food product.

Unit 10 comprises a frame 4 defined by two sides 5 (only one shown) and by two transverse walls 6, 7 parallel to each other and fixed rigidly between sides 5 to define, with sides 5, a compartment 8; and two forming chains 11, 12 supported by frame 4 and respectively comprising first jaws 13—hereinafter referred to simply as "jaws 13"—and second jaws or counterjaws 14, which cooperate with each other to interact with the tube 3 of packaging material fed through compartment 8 along a vertical path A.

Chains 11 and 12 define respective endless paths P, Q along which jaws 13 and counterjaws 14 are fed. Paths P, Q extend respectively about walls 6, 7 of frame 4, and comprise respective substantially straight, parallel work portions P1, Q1 adjacent to and extending substantially symmetrically on opposite sides of path A of tube 3, so that respective equally spaced cross sections 15 of tube 3 are gripped between pairs of corresponding jaws 13 and counterjaws 14.

Jaws 13 and counterjaws 14 are an integral part of, and defile alternate links of, respective chains 11, 12, and are connected in articulated manner by pairs of rods 16.

The devices for supporting, driving and guiding chains 11, 12 are known, e.g. from EP-A-O 887 263, and therefore not described in detail. Suffice it to say that the movement of jaws 13 and counterjaws 14 is defined by cams 17, 18 fitted to walls 6, 7.

Jaws 13 and counterjaws 14 are elongated in a direction perpendicular to path A and parallel to walls 6, 7 of frame 4, and have respective pairs of guide rollers 21, 22 which roll along cams 17, 18.

Each jaw 13 comprises, in known manner, an induction heating element 23 extending crosswise to path A and defining two straight, parallel, front active surfaces (not shown).

In place of heating element 23, each counterjaw 14 comprises a pressure bar 24; and the heating element 23 of each jaw 13 and the bar 24 of the corresponding counterjaw 14 cooperate with each other to grip a respective cross section 15 of tube 3 and heat seal the packaging material. On a front surface facing, in use, the corresponding jaw 13, bar 24 has two pads (not shown) made of relatively flexible elastomeric material and which cooperate with the packaging material in opposition to the active surfaces of heating, element 23.

Advantageously, the heating element 23 of each jaw 13 and the bar 24 of the corresponding counterjaw 14 are held contacting the packaging material of tube 3 for a time T1 shorter than the time T required to completely seal cross sections 15, but sufficient to form respective aseptic transverse sealing bands 25 capable of withstanding the handling to which the packages 2 coming off unit 10 are subjected prior to reaching unit 20 where, as explained in detail later on, the sealing of transverse bands 25 is completed.

Each counterjaw 14 comprises a knife 26 for cutting tube 3 at sealing bands 25 and so detaching from tube 3 the packages 2 coming of forming chains 11, 12 and to be folded into the finished shape.

Knife 26 is flat, rectangular and elongated in the direction of the major dimension of counterjaw 14, is housed in sliding manner inside a mid slot in pressure bar 24, and is controlled by a known cam actuating device not shown.

Jaws 13 and counterjaws 14 comprise respective devises for controlling the volume of packages 2 as they are being formed, and which are not described or shown by not forming part of the present invention.

Unit 20 (FIGS. 1 and 2) is located downstream from unit 10 and is run through by a belt conveyor 30 on to which the packages 2 coming off forming chains 11, 12 are fed by feed devices known, for example, from EP-A-887272 and therefore not described or shown.

Conveyor 30 is located below and to one side of forming chains 11, 12, and comprises a conveyor belt 31 looped about two pulleys (not shown), and a horizontal top branch 32 of which defines a straight, horizontal path B along which pack ages 2 are fed.

Packages 2 are positioned horizontally on belt 31, with respective sealing bands 25 projecting from opposite sides of belt 31 and extending parallel to path 3.

Conveyor 30 also comprises a number of paddles or push members 33 projecting perpendicularly outwards from, and equally spaced along, belt 31, and each of which cooperates with and pushes the upstream lateral wall of a respective package 2 to feed the package along path B.

Unit 20 substantially comprises a hot-air heating station 34 and a jaw pressing station 35, which are known, for example, from GB 1370831, are located along the opposite sides of top branch 32 of belt 31, and interact successively with sealing bands 25 of the packages 2 on belt 31 to seal the bands completely.

More specifically, station 34 directs a stream of hot air on to sealing bands 25 to increase the temperature of the bands, and station 35 exerts pressure on and cools the heated sealing bands 25 to achieve a strong, long-lasting seal.

Alternatively, unit 20 may comprise, on each side of conveyor 30, two forming chains of the same type as chains 11, 12 and having respective jaws interacting with one another to grip the sealing bands of packages 2 and seal the bands completely by means of hearing elements or ultrasonic sealing elements carried by the jaws themselves.

In a further alternative, unit 20 may comprise, on each side of conveyor 30, two heated counter-rotating pressure rollers between which to press and completely seal sealing bands 25 of packages 2 on conveyor 30.

Operation of packaging machine 1, already partly obvious from the foregoing description, is as follows.

Jaws 13 and counterjaws 14 interact cyclically with tube 3 of packaging material according to the movement imposed by cams 17, 18. Following initial impact and gradual compression of tube 3 along cross sections 15, jaws 13 and counterjaws 14 reach portions P1, Q1 of respective paths P, Q, along which maximum pressure is exerted on tube 3 and heating elements 23 of jaws 13 are powered to temporarily heat seal the packaging material. More specifically, heating element 23 is held contacting the packaging material of tube 3 for the time T1 it takes to form a respective aseptic sealing band 25 capable of withstanding the handling to which packages 2 are subjected prior to reaching unit 20, but not long enough to completely seal the packaging material.

In the course of the above steps, knife 26 remains in a rest position housed inside respective pressure bar 24 and not interacting with tube 3.

At the same time, the volume-control devices on jaws 13 and counterjaws 14 interact with the lateral surface of the package 2 being formed, so as to impose a predetermined shape, which is assisted by performed crease lines on the packaging material.

Before jaw 13 and respective counterjaw 14 release the packaging material, knife 26 is extracted from pressure bar 24 to cut the packaging material along a respective sealing band 25.

Following the cutting operation, jaw 13 and respective counterjaw 14 part and package 2, detached from the continuous tube 3 of packaging material and still in the form or a pillow pack, is guided towards and fed on to belt conveyor 30 in a horizontal position with sealing bands 25 projecting from opposite sides of belt 31.

As it is fed along path B, each package 2 travels successively through station 34, where it is hot-air heated locally along sealing bands 25, and through station 35, where pressure is exerted by jaws on the heated sealing bands 25 to seal them completely.

The advantages or packaging machine 1 according to the present invention will be clear from the foregoing description.

In particular, by sealing packages 2 in two successive operations performed by distinct forming units (10, 20), the output rate of packaging machine 1 is made independent of the time (T) taken to completely seal packages 2. That is, by limiting the length of time heating element 23 is kept contacting the packaging material to the strict minimum required to obtain a temporary seal of tube 3 capable of ensuring the packages 2 coming off unit 10 remain aseptic at least until they arrive at unit 20, the output rate of packaging machine 1 may be increased to the limit imposed by the mechanics of the machine itself.

Clearly, changes may be made to packaging machine 1 as described herein without, however, departing from the scope of the present invention.

In particular, the packaging material may be sealed ultrasonically; and the cutting operation may advantageously be performed prior to sealing by heating elements 23 of jaws 13.

What is claimed is:

1. A method of producing sealed packages of a pourable food product from a tube of heat-seal sheet packaging material, fed along a vertical path and filled continuously with said food product, said method comprising the steps of:

gripping said tube at equally spaced cross sections; and sealing the packaging material of said tube along said cross sections;

and wherein said sealing step comprises a first and a second sealing operation performed successively on distinct units of a packaging machine for producing said packages; said first sealing operation being performed along said cross sections for a time shorter than the time required to achieve permanent sealing of the cross sections, but sufficient to form respective temporary aseptic transverse sealing bands; and said second sealing operation being performed to finally seal said temporary sealing bands.

2. A method as claimed in claim 1, comprising, prior to said second sealing operation, the step of cutting said tube at each of said cross sections.

3. A method as claimed in claim 2, wherein said cutting step is performed after said first sealing operation.

4. A method as claimed in claim 1, wherein said first and said second sealing operation comprise heat sealing the packaging material.

5. A packaging machine for producing sealed aseptic packages of a pourable food product from a tube of packaging material fed along a vertical path and filled continuously with said food product, said machine comprising:

gripping means for gripping said tube at equally spaced cross sections; and sealing means for sealing the packaging material of said tube along said cross sections;

and wherein said sealing means comprise a first and a second sealing device forming part of respective distinct, successive units of said machine; said first sealing device interacting with said cross sections for a time shorter than the time required to achieve permanent sealing of the cross sections, but sufficient to form respective temporary aseptic transverse sealing bands; and said second sealing device interacting with said temporary sealing bands to seal them completely.

6. A machine as claimed in claim 5 comprising cutting means located upstream from at least said second sealing device and selectively activated to detach the formed packages from said tube by a transverse cut along said cross sections.

7. A machine as claimed in claim 5, wherein said gripping means comprise at least two pairs of jaws acting cyclically and successively on said tube.

8. A machine as claimed in claim 7, wherein said first sealing device is carried by said jaws.

9. A machine as claimed in claim 7, comprising a first and second forming chain having respective numbers of said jaws and defining respective endless paths along which the jaws are fed, and which have respective adjacent work portions extending substantially symmetrically on opposite sides of said path of said tube of packaging material.

10. A machine as claimed in claim 9, wherein said cutting means are carried by said jaws of one of said forming chains.

* * * * *